United States Patent
Shu

(10) Patent No.: US 12,518,510 B2
(45) Date of Patent: Jan. 6, 2026

(54) MACHINE LEARNING FOR VECTOR MAP GENERATION

(71) Applicant: ECOPIA TECH CORPORATION, Toronto (CA)

(72) Inventor: Yuanming Shu, Toronto (CA)

(73) Assignee: Ecopia Tech Corporation, Toronto (CA)

(*) Notice: Subject to any disclaimer, the term of this patent is extended or adjusted under 35 U.S.C. 154(b) by 645 days.

(21) Appl. No.: 17/731,769

(22) Filed: Apr. 28, 2022

(65) Prior Publication Data

US 2023/0351728 A1 Nov. 2, 2023

Related U.S. Application Data

(60) Provisional application No. 63/335,464, filed on Apr. 27, 2022.

(51) Int. Cl.
*G06V 10/766* (2022.01)
*G06N 20/00* (2019.01)
*G06V 10/75* (2022.01)
*G06V 10/77* (2022.01)
*G06V 10/774* (2022.01)
*G06V 10/82* (2022.01)

(52) U.S. Cl.
CPC .......... *G06V 10/766* (2022.01); *G06N 20/00* (2019.01); *G06V 10/75* (2022.01); *G06V 10/7715* (2022.01); *G06V 10/774* (2022.01); *G06V 10/82* (2022.01)

(58) Field of Classification Search
None
See application file for complete search history.

(56) References Cited

U.S. PATENT DOCUMENTS

| | | |
|---|---|---|
| 8,520,940 B1 | 8/2013 | Schpok et al. |
| 10,719,742 B2 | 7/2020 | Shechtman et al. |
| 2019/0034714 A1 | 1/2019 | Barth et al. |
| 2019/0318227 A1 | 10/2019 | Bronstein et al. |
| 2019/0355150 A1 | 11/2019 | Tremblay et al. |
| 2019/0362237 A1 | 11/2019 | Choi et al. |
| 2020/0372710 A1 | 11/2020 | Wang et al. |

(Continued)

FOREIGN PATENT DOCUMENTS

JP 2004348708 A * 12/2004

OTHER PUBLICATIONS

Acuna, David, et al. "Efficient interactive annotation of segmentation datasets with polygon-rnn++." Proceedings of the IEEE conference on Computer Vision and Pattern Recognition. 2018. (Year: 2018).*

(Continued)

*Primary Examiner* — Matthew C Bella
*Assistant Examiner* — Johnny B Duong
(74) *Attorney, Agent, or Firm* — Damian Rolfe

(57) ABSTRACT

Methods and systems for generating vector maps representing features depicted in imagery are provided. An example method involves obtaining remote imagery that depicts a feature, applying a machine learning model to the remote imagery to extract a geometric model of the feature encoded as a tokenized representation of a sequence of annotation operations, and interpreting the tokenized representation as a vector map representing the geometric model of the feature.

20 Claims, 11 Drawing Sheets

(56) References Cited

U.S. PATENT DOCUMENTS

| | | | |
|---|---|---|---|
| 2021/0149022 A1 | 5/2021 | Kehl et al. | |
| 2022/0038172 A1 | 2/2022 | Kergieman et al. | |
| 2023/0196630 A1* | 6/2023 | Hertzmann | G06N 3/0455 |
| | | | 382/157 |

OTHER PUBLICATIONS

Blaylock, Nate, Bradley Swain, and James Allen. "TESLA: A tool for annotating geospatial language corpora." Proceedings of Human Language Technologies, Companion Volume: Short Papers. 2009. (Year: 2009).*

Jochem, Warren C., and Andrew J. Tatem. "Tools for mapping multi-scale settlement patterns of building footprints: An introduction to the R package foot." PLoS One 16.2 (2021): e0247535. (Year: 2021).*

Baloian, Nelson, Daniel Biella, and Wolfram Luther. "GPS Drawing on Street Networks: Extracting Routes from Polygonal Coverings." Collaborative Technologies and Data Science in Artificial Intelligence Applications. (Year: 2020).*

Mi, Lu, et al. "Hdmapgen: A hierarchical graph generative model of high definition maps." Proceedings of the IEEE/CVF Conference on Computer Vision and Pattern Recognition. 2021. (Year: 2021).*

Baskaran, Savitha, Shiaofen Fang, and Shenhui Jiang. "Spatiotemporal visualization of traffic paths using color space time curve." 2017 IEEE International Conference on Big Data (Big Data). IEEE, 2017. (Year: 2017).*

Chen, Jiacheng, Yiming Qian, and Yasutaka Furukawa. "Heat: Holistic edge attention transformer for structured reconstruction." Proceedings of the IEEE/CVF conference on computer vision and pattern recognition. 2022. (Year: 2022).*

Curlew. âAnswer to âDetermining the Centroid of Polygons in QGIS.ââ Geographic Information Systems Stack Exchange, Jan. 4, 2013, https://gis.stackexchange.com/a/45244. (Year: 2013).*

Zeng, Chuiqing, Jinfei Wang, and Brad Lehrbass. "An evaluation system for building footprint extraction from remotely sensed data." IEEE Journal of Selected Topics in Applied Earth Observations and Remote Sensing 6.3 (2013): 1640-1652. (Year: 2013).*

Chiu, Mang Tik, et al. "Agriculture-vision: A large aerial image database for agricultural pattern analysis." Proceedings of the IEEE/CVF Conference on Computer Vision and Pattern Recognition. 2020. (Year: 2020).*

Zorzi, Stefano, et al. PolyWorld: Polygonal Building Extraction with Graph Neural Networks in Satellite Images. arXiv:2111.15491, arXiv, Apr. 6, 2022. arXiv.org, https://doi.org/10.48550/arXiv.2111.15491. (Year: 2022).*

Zhou, Yuanen, et al. "Semi-autoregressive transformer for image captioning." Proceedings of the IEEE/CVF international conference on computer vision. 2021. (Year: 2021).*

Zhao, Wufan, Claudio Persello, and Alfred Stein. "Building outline delineation: From aerial images to polygons with an improved end-to-end learning framework." ISPRS journal of photogrammetry and remote sensing 175 (2021): 119-131. (Year: 2021).*

Nash, Charlie, et al. "Polygen: An autoregressive generative model of 3d meshes." International conference on machine learning. PMLR, 2020. (Year: 2020).*

Carleton College (2012), Earth Analysis Techniques. https://web.archive.org/web/20120621191349/https://serc.carleton.edu/earth_analysis/image_analysis/advanced/day_3_part_2.html. Science Education Resource Center at Carleton College, Internet Website, Jun. 2012 (Jun. 2012), (abstract) [online] [retrieved on Jun. 8, 2023 (Jun. 8, 2023)]. Retrieved from the Internet: https://web.archive.org/web/20120621191349/https://serc.carleton.edu/earth_analysis/image_analysis/advanced/day_3_part_2.html.

Acuna, et al., Efficient Interactive Annotation of Segmentation Datasets with Polygon-RNN++, arXiv:1803.09693v1 [cs.CV] Mar. 26, 2018.

Homayounfar, et al., Hierarchical Recurrent Attention Networks for Structured Online Maps, arXiv:2012.12314v1 [cs.CV] Dec. 22, 2020.

Cheng, et al., DARNet: Deep Active Ray Network for Building Segmentation, arXiv: 1905.05889v1 [cs.CV] May 15, 2019.

Homayounfar, et al., DAGMapper: Learning to Map by Discovering Lane Topology, arXiv:2012.12377v1 [cs.CV] Dec. 22, 2020.

Microsoft (2018), Computer generated building footprints for the United States (v2.0) [USBuildingFootprints]. https://github.com/microsoft/USBuildingFootprints.

Nash, et al., PolyGen: An Autoregressive Generative Model of 3D Meshes, arXiv:2002.10880v1 [cs.GR] Feb. 23, 2020.

Ganin, et al., Computer-Aided Design as Language, arXiv:2105.02769v1 [cs.CV] May 6, 2021.

Baillard, et al., Automatic line matching and 3D reconstruction of buildings from multiple views, ISPRS Conference on Automatic Extraction of GIS Objects from Digital Imagery, Sep. 1999, Munich, Germany. pp. 69-80. inria-00590111.

Sinha, et al., Interactive 3D Architectural Modeling from Unordered Photo Collections, In ACM SIGGRAPH Asia 2008 papers (SIGGRAPH Asia '08). Association for Computing Machinery, New York, NY, USA, Article 159, 1-10. DOI: https://doi.org/10.1145/1457515.1409112.

Cipolla, et al., PhotoBuilder—3D Models of Architectural Scenes from Uncalibrated Images, IEEE International Conference on Multimedia Computing and Systems, Jun. 1999, Florence, Italy. pp. 25-31, 10.1109/MMCS.1999.779115. inria-00590113.

Debevec, et al., Modeling and Rendering Architecture from Photographs: A hybrid geometry- and image-based approach, In Proceedings of the 23rd annual conference on Computer graphics and interactive techniques (SIGGRAPH '96). Association for Computing Machinery, New York, NY, USA, 11-20. DOI: https://doi.org/10.1145/237170.237191.

Van den Oord, et al., Pixel Recurrent Neural Networks, arXiv:1601.06759v3 [cs.CV] Aug. 19, 2016.

Van den Oord, et al., Conditional Image Generation with PixelCNN Decoders, arXiv:1606.05328v2 [cs.CV] Jun. 18, 2016.

Extended European Search Report (EESR) to Application No. 23795746.9-1218 / 4437497 PCT/IB2023054237, dated Jun. 11, 2025.

Zuoyue Li et al.: "Topological Map Extraction from Overhead Images", arxiv.org, Cornell University Library, 201 Olin Library Cornell University Ithaca, NY 14853, Dec. 4, 2018 (Dec. 4, 2018), XP081199909.

Li Ziming et al.: "A Deep Learning-Based Framework for Automated Extraction of Building Footprint Polygons from Very High-Resolution Aerial Imagery", Remote Sensing (Basel, Switzerland), vol. 13, No. 18, Sep. 11, 2021 (Sep. 11, 2021), pp. 3630-3631, XP093196696.

Chen Qi et al.: "An end-to-end shape modeling framework for vectorized building outline generation from aerial images", ISPRS Journal of Photogrammetry and Remote Sensing, Amsterdam [U.A.] : Elsevier, Amsterdam, NL, vol. 170, Oct. 27, 2020 (Oct. 27, 2020), pp. 114-126, XP086353058.

Li Changjian Changjian Li@UCL AC UK et al.: "Sketch2CAD", ACM Transactions on Graphics, ACM, NY, US, vol. 39, No. 6, Nov. 26, 2020 (Nov. 26, 2020), pp. 1-14, XP058683346.

Wu Rundi et al.: "DeepCAD: A Deep Generative Network for Computer-Aided Design Models", 2021 IEEE/CVF International Conference On Computer Vision (ICCV), IEEE, Oct. 10, 2021 (Oct. 10, 2021), pp. 6752-6762, XP034092162.

International Search Report and Written Opinion issued by the CIPO in PCT/IB2023/054242, dated Aug. 15, 2023.

Extended European Search Report and Written Opinion issued by the European Patent Office (EPO) in European Application No. EP 23795747.7-1218 / 4437466 PCT/IB2023054242, dated Apr. 11, 2025.

Xu, C. et al. "You Only Group Once: Efficient Point-Cloud Processing with Token Representation and Relation Inference Module", arXiv .org, v2, pp. 1-8, Mar. 24, 2021 (Mar. 24, 2021), retrieved from https://arxiv.org/abs/2103.09975 on Aug. 9, 2023 (Sep. 8, 2023).

(56) References Cited

OTHER PUBLICATIONS

Chan, C. et al. "Learning to generate line drawings that convey geometry and semantics", arXiv.org, v3, pp. 1-17, Mar. 29, 2022 (Mar. 29, 2022), retrieved from https://arxiv.org/abs/2203.12691 on Aug. 13, 2023 (Aug. 13, 2023).

Lin, C. et al. "Modeling 3D Shapes by Reinforcement Learning", arXiv.org, v3, pp. 1-20, Sep. 17, 2020 (Sep. 17, 2020), retrieved from https://arxiv.org/abs/2003.12397 on Aug. 10, 2023 (Oct. 8, 2023).

Vilnis, Luke "Geometric Representation Learning", University of Massachusetts Amherst, Doctoral Dissertation, pp. 1-144, Apr. 30, 2021 (Apr. 30, 2021), retrieved from https://scholarworks.umass.edu/cgi/viewcontent.cgi?article=3195&context=dissertations 2. on Aug. 10, 2023 (Oct. 8, 2023).

Sanik, Kevin "The relative effectiveness ofline drawing algorithms at depicting 3D shape", Rutgers University, Doctoral Dissertation, pp. 1-100, May 31, 2015 (May 31, 2015), retrieved from https://rucore.libraries.rutgers.edu/rutgers-lib/47579/ on Aug. 10, 2023 (Oct. 8, 2023).

Najibi, M. et al. "DOPS: Learning to Detect 3D Objects and Predict their 3D Shapes", arXiv.org, v2, pp. 1-10, Apr. 7, 2020 (Jul. 4, 2020), retrieved from https://arxiv.org/abs/2004.01170 on Aug. 11, 2023 (Nov. 8, 2023).

Hoang, L. et al. "A 3D Shape Recognition Method Using Hybrid Deep Learning Network CNN-SVM", electronics, vol. 9, Issue 4, pp. 1-14, Apr. 15, 2020 (Apr. 15, 2020), retrieved from https://www.mdpi.com/2079-9292/9/4/649 on Aug. 11, 2023 (Nov. 8, 2023).

Wu Rundi et al.: "DeepCAD: A Deep Generative Network for Computer-Aided Design Models", 2021 IEEE/CVF International Conference on Computer Vision (ICCV), IEEE, Oct. 10, 2021 (Oct. 10, 2021), pp. 6752-6762, XP034092162, Doi: 10.1109/ICCV48922.2021.00670, [retrieved on Feb. 10, 2022].

Changjian Li et al.: "Sketch2CAD: Sequential CAD Modeling by Sketching in Context", arxiv.org, Cornell University Library, 201 Olin Library Cornell University Ithaca, NY 14853, Sep. 10, 2020 (Sep. 10, 2020), XP081760124.

* cited by examiner

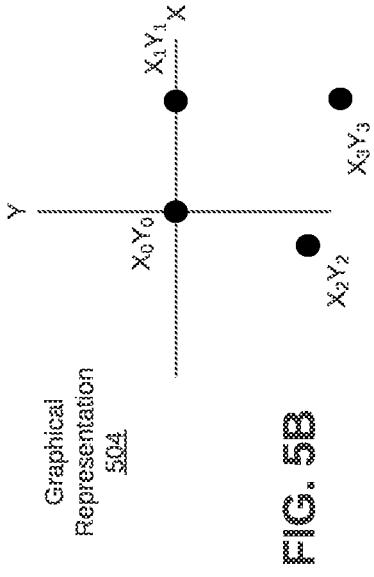
FIG. 5B
Graphical Representation 504
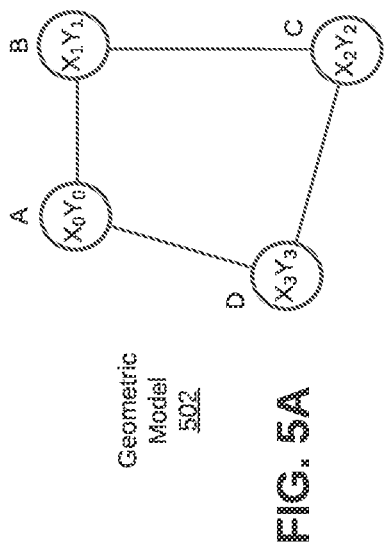
FIG. 5A
Geometric Model 502
FIG. 5C
Polygon Set Representation {X₀Y₀, X₁Y₁, X₂Y₂, X₃Y₃, X₀Y₀} 506
FIG. 5D
Tokenized Representation 508

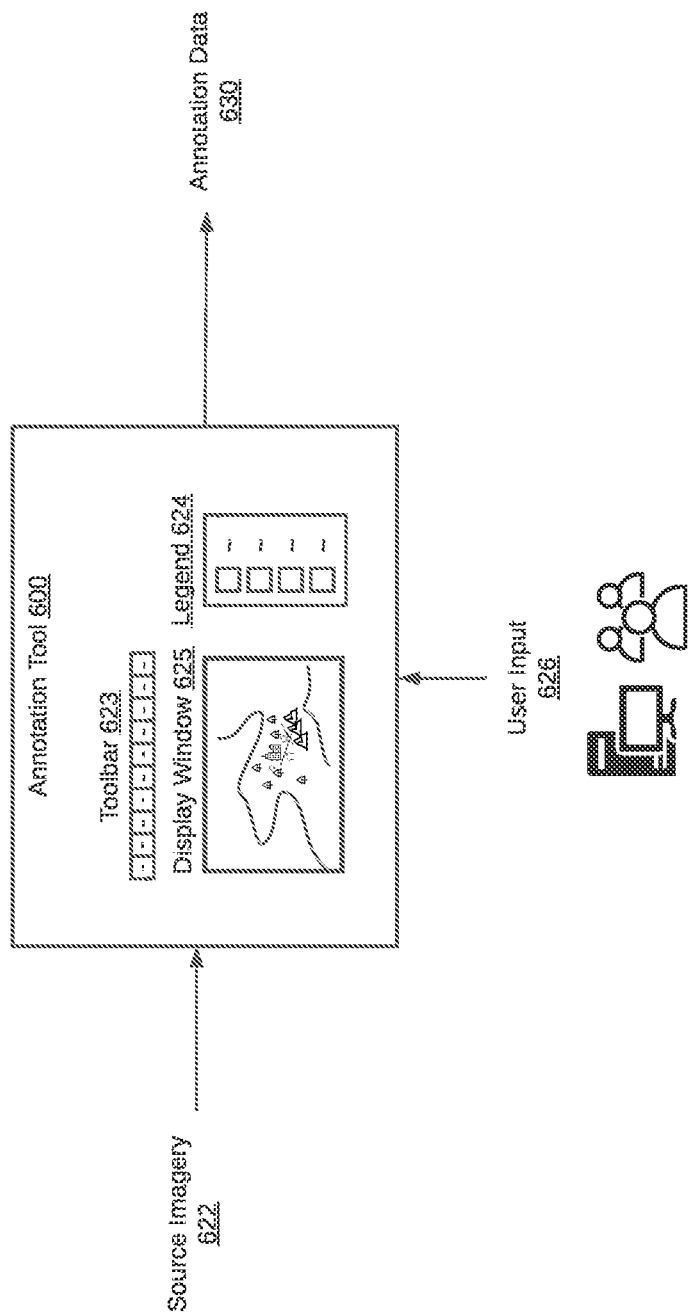

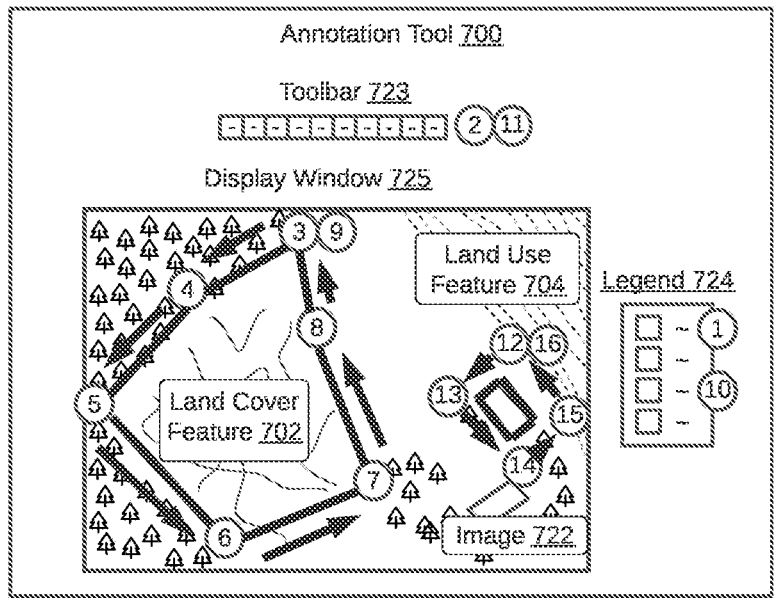
FIG. 7A
Annotation Sequence 750
FIG. 7B
① Start Swamp
② Draw Line
③ Start Line at (56, 34)
④ Continue Line to (37, 46)
⑤ Continue Line to (5, 73)
⑥ Continue Line to (42, 105)
⑦ Continue Line to (63, 88)
⑧ Continue Line to (55, 57)
⑨ Close Polygon
⑩ Start Building Footprint
⑪ Draw Line
⑫ Start Line at (84, 74)
⑬ Continue Line to (79, 82)
⑭ Continue Line to (87, 88)
⑮ Continue Line to (93, 83)
⑯ Close Polygon
Tokenized Representation 760
FIG. 7C
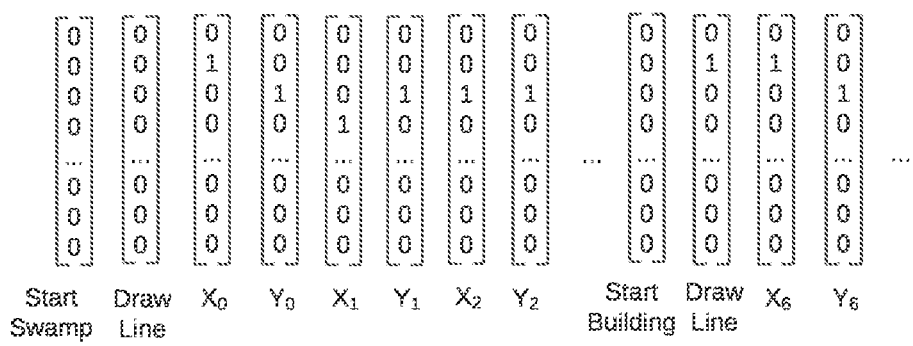

MACHINE LEARNING FOR VECTOR MAP GENERATION

BACKGROUND

Geospatial information is commonly presented as raster data or as vector data. Raster data presents an area of the world as a regular grid of cells, with attributes associated with each cell. A common example of geospatial information presented as raster data is an aerial image. Raster data can also be used to present semantic information extracted from imagery (i.e., raster labels). In contrast, vector data can be used to present semantic information extracted from imagery as a set of geometric entities (e.g., polygons, lines, points) with attributes associated with geometric entities. A common example of geospatial information presented as vector data is a vector map. Vector maps may be preferred over raster labels in many applications for scalability, compactness, and the ease with which vector data can be edited and manipulated.

BRIEF DESCRIPTION OF THE DRAWINGS

FIG. 5A depicts an example geometric model derived from vector data generated in accordance with the systems and methods described herein.

FIG. 5B depicts a corresponding graphical representation. FIG. 5C depicts a corresponding polygon set representation. FIG. 5D depicts a corresponding tokenized representation.

FIG. 6 is a schematic diagram of an example annotation tool for generating training data for training a machine learning model to extract geometry, and feature types, if applicable, of features depicted in imagery.

FIG. 7A is a schematic diagram depicting an example of a remote image being annotated through a user interface. FIG. 7B depicts a sequence of annotation operations carried out during the annotation process. FIG. 7C depicts a tokenized representation of the sequence of annotation operations.

DETAILED DESCRIPTION

Figure 1:
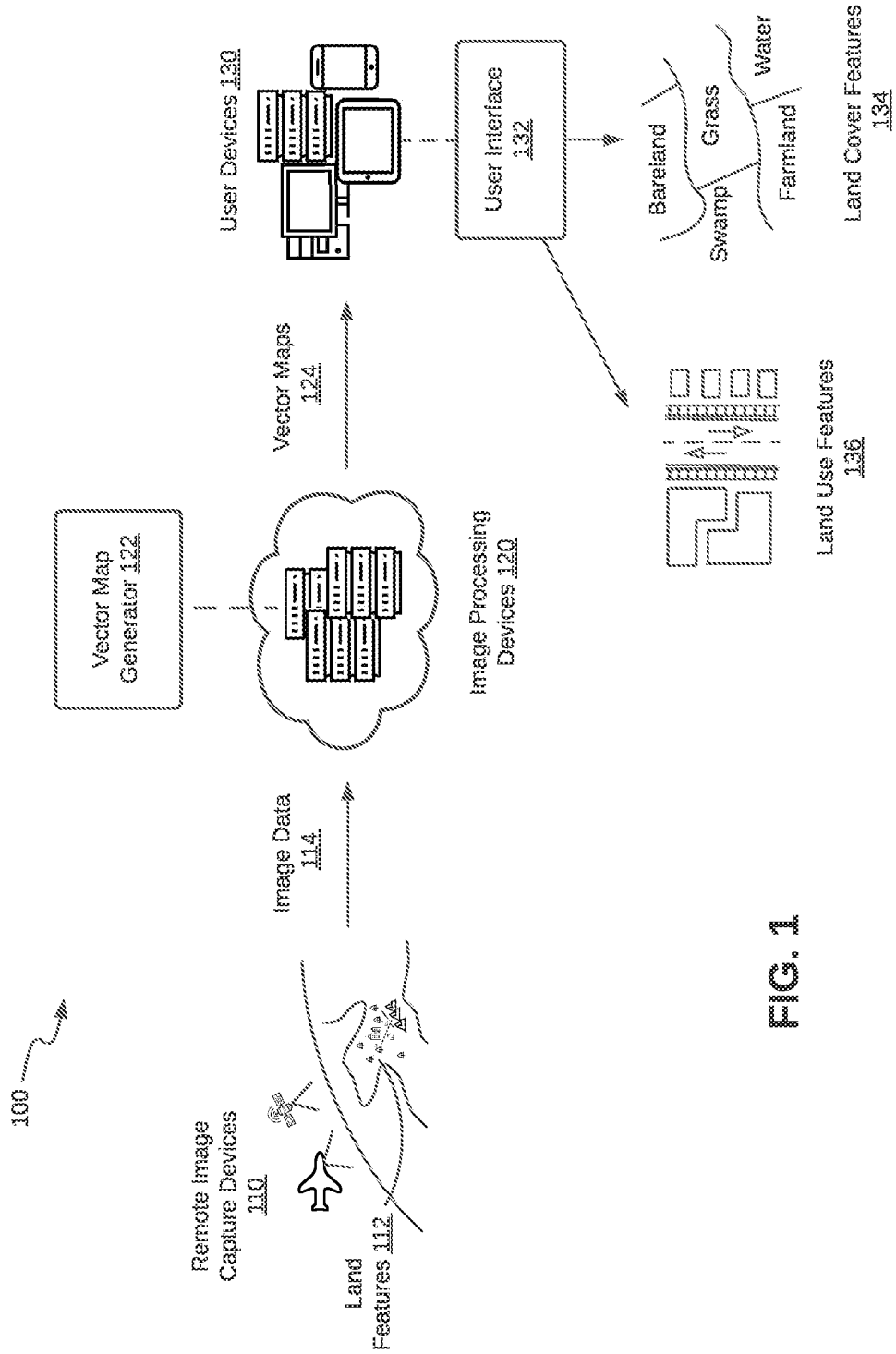
FIG. 1 is a schematic diagram of an example system for generating a vector map representing a feature extracted from remote imagery.

Vector maps can be manually extracted from imagery using software platforms that allow individuals to manually annotate images through a user interface. However, image annotation can be a laborious task, especially at large scales and at high accuracy.

Early attempts to automate the extraction of vector maps from imagery have focused on developing deep learning models to generating raster labels that label each pixel of an image with information (e.g., object, feature type) and then employ engineering hand-crafted rulesets to further convert raster labels into vector maps. However, such heuristics rulesets lacked flexibility and generalization across various structure types, contexts, and domains.

Recent attempts include leveraging recurrent neural networks to convert raster images into a sequence of vertices and further connect vertices into polygons or polylines. However, such vertex-based models are incapable of generating more generalized geometric primitives (i.e., curves, circles) and modelling complex spatial constraints between the primitives (i.e., parallel, perpendicular).

The present disclosure follows the approach of directly converting raster imagery into vector maps without generating raster labels as an intermediate step. Further, the present disclosure describes a learned approach in which a machine learning model is trained to extract geometric models with semantic attributes in the format of vector data from imagery in a manner that can be widely generalized. In particular, a machine learning model is trained on image annotation data that contains sequences of image annotation operations and learns to produce sequences of annotation operations given new images. These annotation operations comprise a plurality of coordinates representing vertices of the geometric model of the feature and at least one type of annotation operation associated with the coordinates, which can be then easily interpreted into geometric models with the desired spatial constraints. In this way, a machine learning model is capable of directly extracting complex geometric models comprising a variety of drawing elements (e.g., straight line segments, curves, etc.) and modelling spatial constraints between geometric models. As such, a machine learning model trained as described herein may be used to produce significantly more accurate geometric representations of real-world structures than prior approaches.

Although the techniques described herein can be applied to extract any sort of semantic information from any sort of imagery, they be particularly useful for extracting land use and/or land cover data from aerial or satellite imagery, where scalability is particularly challenging.

One type of machine learning model that may be particularly well-suited to this task is autoregressive generative models, and in particular, autoregressive generative models that apply the concept of attention, such as a transformer model. Such a model may be particularly well-suited to capture the long dependencies inherent to large geometric models, and indeed, inherent to long image annotation sequences present in training data.

FIG. 1 is a schematic diagram of an example system 100 for generating vector maps representing features extracted from remote imagery.

The system 100 includes one or more remote image capture devices 110 to capture image data 114 over an area of the world depicting one or more visible land features 112. A remote image capture device 110 may include any suitable remote sensor (e.g., camera) onboard an aircraft, satellite, drone, balloon, cars, phones, or other device capable of capturing imagery of the world from a distance.

The land features 112 captured in the image data 114 are expected to include land cover features and/or land use features. Land cover features may be understood to be generally pervious surface features (i.e., natural features) such as forests, grass, bare land, shrubs, trees, water, and the like. Land use features may be understood to be generally impervious surface features (i.e., human-made features) such as buildings, roads, bridges, railways, driveways, crosswalks, sidewalks, parking lots, pavement, and the like.

The image data 114 may include raw image data in any suitable format generally made available by the remote image capture device 110 that captures the imagery. The image data 114 may further include metadata associated with such imagery, including camera parameters (e.g., focal length, lens distortion, camera pose), geospatial projection information (e.g., latitude and longitude position), or other data, as may be apparent from this disclosure.

The system 100 further includes one or more image processing devices 120 to process the image data 114. In particular, the image processing devices 120 are configured to extract vector data from the image data 114 and the build vector maps 124 as described herein. Such vector data will typically represent the extracted features as two-dimensional vector maps.

The image processing devices 120 include one or more computing devices, such as servers in a cloud computing environment. Such computing devices include one or more communication interfaces to receive/obtain/access the image data 114 and to output/transmit the vector maps 124 through one or more computing networks and/or telecommunications networks such as the internet. Such computing devices include memory to store programming instructions that embody the functionality described herein and one or more processors to execute such programming instructions.

The image processing devices 120 may store, host, access, run, or execute a vector map generator 122 in order to generate the vector maps 124 as described herein. In brief, the vector map generator 122 includes a machine learning model that is applied to extract the geometry (i.e., shape or geometric model), spatial constraint, and feature type, if applicable, of one or more land features 112 from the image data 114. These vector maps 124 will typically represent a set of points, lines, and/or polygons, with associated spatial constraints, and feature types (if applicable), that represent various land cover features and/or land use features, as previously described. These vector maps 124 can be used as-is, for viewing and manipulation of the geometric features described therein, but generally, these vector maps 124 will be combined with camera and geospatial projection information associated with the imagery to add scale and/or and location information. In the case of remote imagery, the vector maps 124 may be combined with geospatial information to apply the appropriate scale and location information to the geometric entities, thereby enabling such geometric entities to be appropriately plotted on a map and represented in a Geographic Information System (GIS). The vector map generator 122 may be generally understood to comprise a set of non-transitory machine-readable programming instructions (e.g., software code) executable by one or more computing devices, such as the image processing devices 120.

The vector maps 124 may be transmitted to one or more user devices 130, which may be used to store, view, manipulate, and/or otherwise use such vector maps 124. For this purpose, the user devices 130 may store, host, access, run, or execute one or more software programs that process such vector maps 124 (e.g., a GIS viewer). Thus, in the example shown, a user device 130 runs a software program comprising a user interface 132 through which one or more users may view the vector maps 124, shown here to include example land cover features 134 and land use features 136. The vector maps 124 may be delivered to user devices 130 in any suitable format through any suitable delivery means, including as batch files (e.g., .shp) or through an application programming interface (API).

Such vector maps 124 may be particularly useful for city planning, land use planning, architectural and engineering work, risk assessment of property insurance, for environmental assessments, for virtual reality or augmented reality, for automated vehicle navigation, for the generation of a digital twin of a city, and the like.

Figure 2:
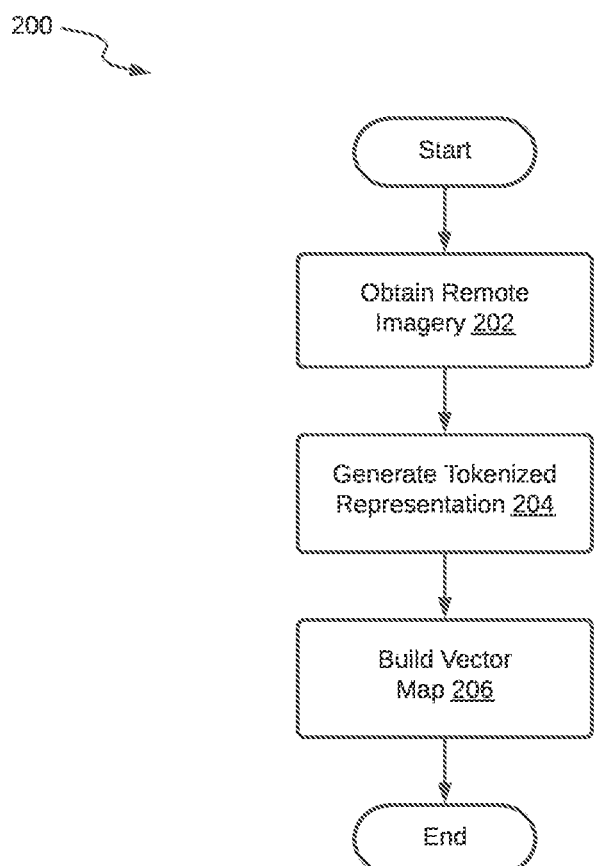
FIG. 2 is a flowchart of an example method for generating a vector map representing a feature extracted from remote imagery.

FIG. 2 is a flowchart of an example method 200 for generating a vector map representing a feature extracted from remote imagery. The method 200 may be understood to be represent one way in which the system 100 of FIG. 1 may work, and thus, for illustrative purposes the method 200 is described with reference to the system 100 of FIG. 1. However, it is to be understood that the method 200 may be applied by other systems and/or devices. The method 200 may be performed by one or more computing devices, including one or more computing devices of one of the example systems described herein.

At operation 202, remote imagery that depicts a visible land feature is obtained. Such remote imagery may include aerial imagery, satellite imagery, or another form of imagery depicting an area of the world captured from a remote distance. The remote imagery may depict one or more land cover or land use features (e.g., land features 112 of FIG. 1). The remote imagery may be associated with camera and geospatial projection information, which together may be referred to generally as image data (e.g., image data 114 of FIG. 1). Such image data may be obtained/received by one or more computing devices (e.g., image processing devices 120 of FIG. 1) through an appropriate communication interface.

At operation 204, a machine learning model is applied to the remote imagery to extract the geometry (i.e., shape and spatial constraints), and in some cases, a feature type, as a tokenized representation. The tokenized representation can be used in a later step to generate vector maps (i.e., vector maps 124 of FIG. 1) which represent one or more geometric models of one or more land use or land cover features captured in the remote imagery (e.g., boundaries of grassland, building footprint). As described later in this disclosure, the tokenized representation contains sequences of coordinate tokens and operation tokens. The coordinate tokens represent the vertices of the resulting geometric entities, whereas the operation tokens represent the type of annotation operations that are used to assemble the vertices together into the resulting geometric entities, including the particular drawing actions that connect the vertices (e.g., straight line segments, curved line segments, two-dimensional primitives, etc.) and the spatial constraints among them (e.g., parallelism).

The machine learning model is trained on annotation data that contains such sequences of annotation operations by which users annotated training imagery with the visible features to be extracted from the imagery. A machine learning model trained on such annotation data may learn to annotate imagery in a manner that emulates the image annotation practices exhibited in such training data. A machine learning model can thereby be configured to produce the tokenized representations containing coordinate tokens and operation tokens described above.

Figure 3:
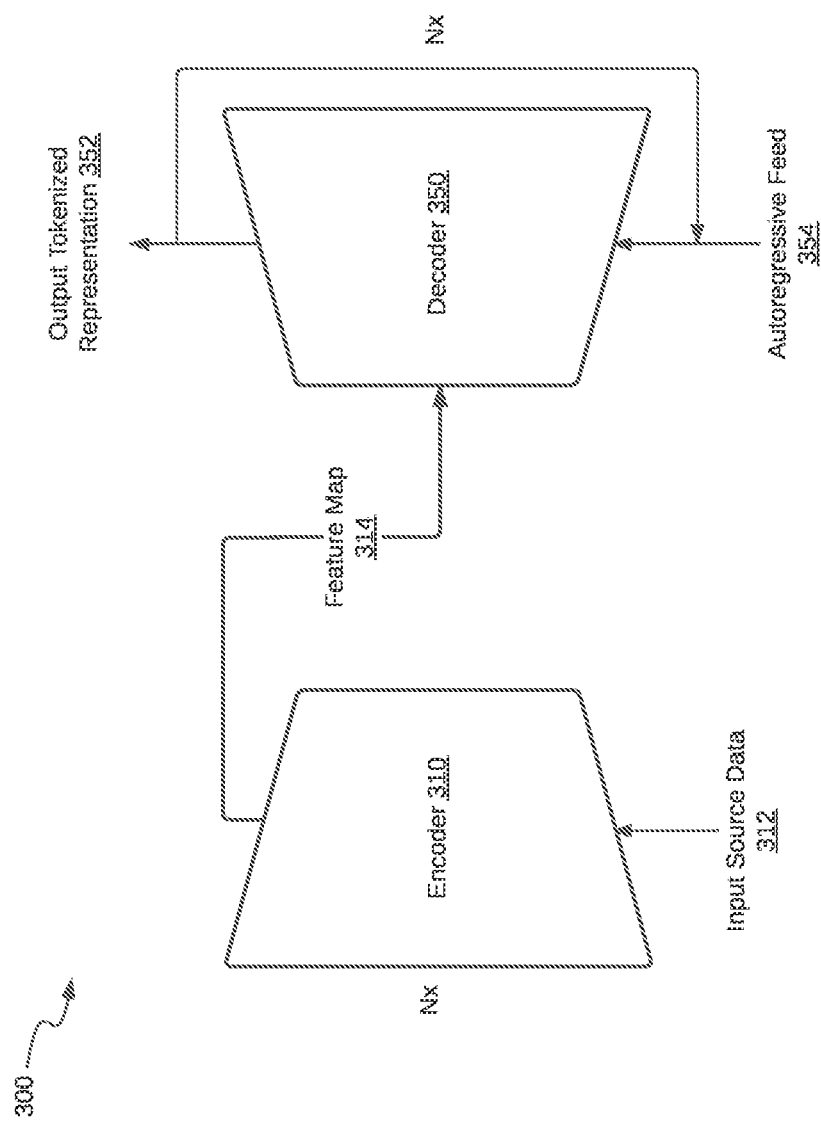
FIG. 3 is a schematic diagram of an example machine learning model for generating a tokenized representation of a feature depicted in imagery.
Figure 4:
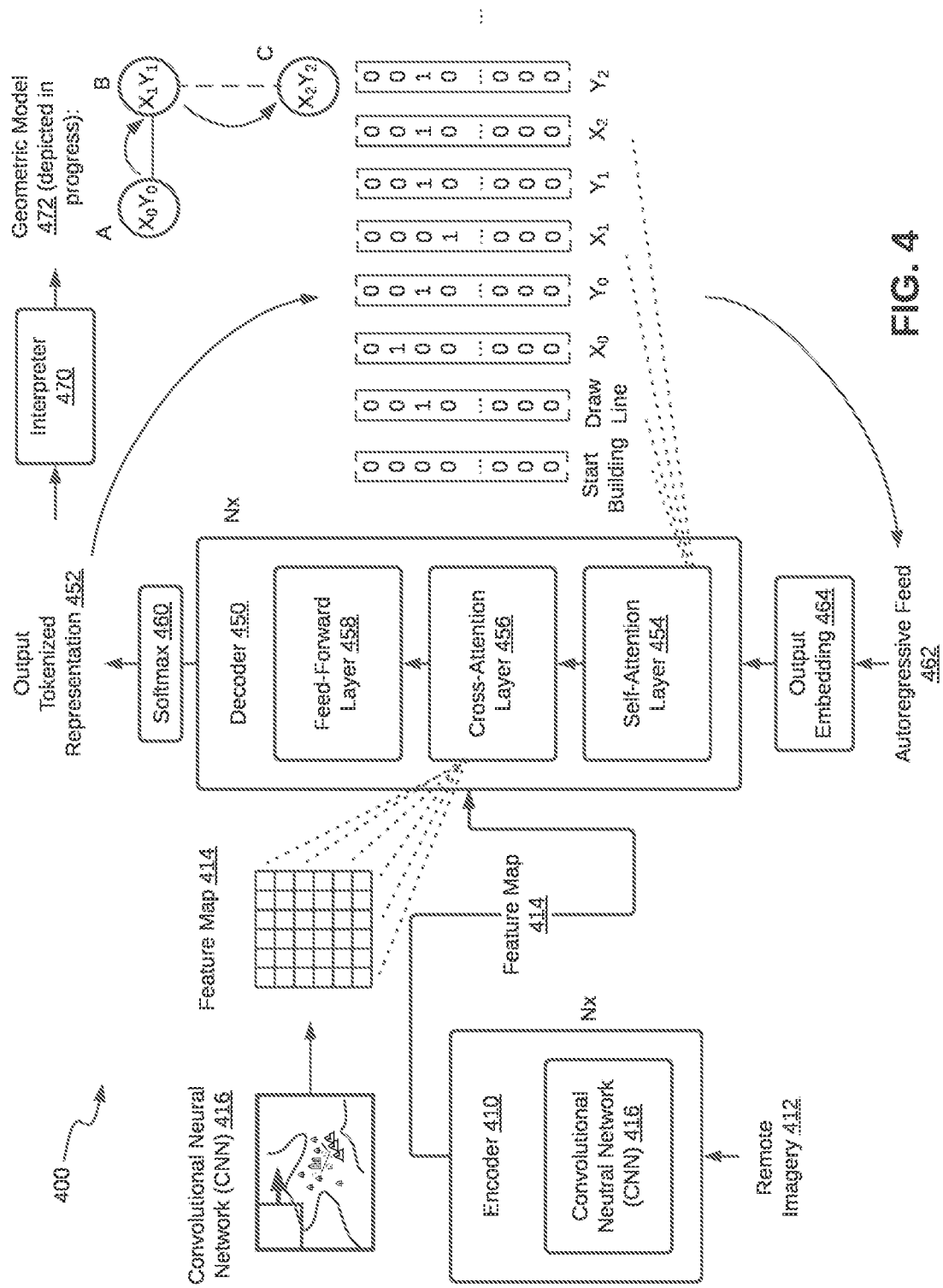
FIG. 4 is a schematic diagram of another example machine learning model for generating a tokenized representation of a feature depicted in imagery, shown in greater detail.

In some examples, the machine learning model is an autoregressive generative model, similar to those shown by way of example in FIG. 3 and FIG. 4, for the capability of such models to capture the long dependency relationships inherent to large geometric models and long sequences of annotation operations. In other examples, alternative machine learning model architecture can be used, provided that such architecture is capable of capturing long dependency relationships.

At operation 206, the tokenized representation is interpreted into a vector map representative of the features extracted from the remote imagery (e.g., vector maps 124 of FIG. 1). Interpreting the tokenized representation into a vector map involves converting the sequence of coordinate tokens and operation tokens in the tokenized representation into mathematical representations of the geometric features encoded for in the tokenized representation, typically a set of vectors and/or other geometric primitives defining the shapes of such features. Where the tokenized representation contains semantic information (i.e., feature types), interpreting the tokenized representation may involve attributing the appropriate geometric entities in the vector map with the appropriate semantic information. This interpretation process may be performed by an interpretation module such as the interpreter 470 of FIG. 4.

In some examples, the vector map may be combined with camera information associated with the remote imagery to add scale information, and/or geospatial projection information to add location information. In the case of extracting land features from remote imagery, the vector maps representing such features, once combined with camera information and geospatial projection information, may be appropriate plotted on a map and represented in a GIS system.

The method 200 and/or any of its steps may be embodied in non-transitory machine-readable programming instructions and executable by one or more processors of one or more computing devices, such as servers in a cloud computing environment, which include memory to store programming instructions that embody the functionality described herein and one or more processors to execute the programming instructions. It is emphasized that the method 200 (with appropriate modifications if applicable) may be applied to extract vector data representing any sorts of features (i.e., land features or other objects or structures) from any sort of imagery captured by any sort of image capture device (e.g., to extract the surroundings of a vehicle in an automated vehicle context, to extract objects from cell phone imagery, etc.).

FIG. 3 is a schematic diagram of an example machine learning model 300 for generating a tokenized representation of a feature depicted in imagery. The machine learning model 300 is to be understood as one example of a machine learning model that can be applied to generate tokenized representations of land features depicted in remote imagery (e.g., as part of the vector map generator 122 of FIG. 1).

The machine learning model 300 is an autoregressive model comprising an encoder 310 and a decoder 350 in a deep learning architecture. The encoder 310 is to process input source data 312, such as remote imagery, to generate a feature map 314. The feature map 314 encodes key features of the input source data 312. For example, where the machine learning model 300 is to extract land cover and land use features from remote imagery, the feature map 314 will encode for geometric information about the various land features depicted in the imagery (e.g., shape, spatial constraint), and if applicable, the feature types associated with such features (e.g., building footprint, grassland, etc.).

The encoder 310 may include any suitable encoding layers, such as a self-attention layer (that applies attention among the elements of the input sequence), a convolutional neural network (CNN), a combination thereof, or other type of encoding layer capable of encoding key information about the features depicted in the input source data 312. The encoder 310 may comprise a block of several of such encoding layers (Nx) stacked on top of one another.

The decoder 350 is to decode the feature map 314 into an output tokenized representation 352 of the features depicted in the input source data 312. The decoder 350 is autoregressive in that it uses both the feature map 314 and any previously-generated elements of the output tokenized representation 352, depicted here as the autoregressive feed 354, to generate the output tokenized representation 352.

The decoder 350 may include any suitable decoding layers, such as a self-attention layer, a cross-attention layer (that applies attention between the elements of the input sequence and the output sequence), a deconvolution layer, or a combination thereof. The decoder 350 may comprise a block of several of such decoding layers (Nx) stacked on top of one another.

The machine learning model 300 may include additional components such as embedding layers, positional encoding, additional neural layers, output activation functions, and other components.

The output tokenized representation 352 is a sequence of coordinate tokens and operation tokens which may be interpreted to represent the features extracted from the input source data 312. Following further processing into a vector map by an interpretation module, the output tokenized representation 352 may be used in conventional GIS software, Computer-Aided Design (CAD) software, and the like.

The machine learning model 300 (and any of its subcomponents) may be embodied in non-transitory machine-readable programming instructions and executable by one or more processors of one or more computing devices. which include memory to store programming instructions that embody the functionality described herein and one or more processor to execute the programming instructions.

FIG. 4 is a schematic diagram of another example machine learning model 400 for generating a tokenized representation of a feature depicted in imagery. The machine learning model 400 may be understood to be similar to the machine learning model 300 of FIG. 3, shown with greater details, as applied to the use case of extracting land cover and/or land use features from remote imagery.

The machine learning model 400 is another autoregressive model comprising an encoder 410 and decoder 450 in a deep learning architecture. The encoder 410 is to process remote imagery 412 to generate a feature map 414. The feature map 414 encodes key features of the remote imagery 412, including the geometry (i.e., shape, spatial constraint) of land cover and land use features visible in the remote imagery 412, and their associated feature types.

The encoder 410 includes a convolutional neural network (CNN) 416 as the primary encoding layer. The CNN 416 is applied over the remote imagery 412 to extract features from the imagery. The encoder 410 may comprise a block of several of such CNN layers (Nx) stacked on top of one another.

The decoder 450 is to decode the feature map 414 into an output tokenized representation 452 of the features depicted in the remote imagery 412. The decoder 450 is autoregressive in that it uses both the feature map 414 and any previously-generated elements of the output tokenized representation 452, depicted here as the autoregressive feed 462, to generate the output tokenized representation 452.

The decoder 450 includes a self-attention layer 454 (to apply attention among the elements of the autoregressive feed 462), a cross-attention layer 456 (to apply attention between the elements of the autoregressive feed 462 and the feature map 414), and a feed-forward layer 458 for further processing. The decoder 450 may comprise a block of several of such decoding layers (Nx) stacked on top of one another. The output of the decoder 450 is fed into a softmax function 460. Prior to input into the decoder 450, the autoregressive feed 462 is converted into an output embedding by output embedding layer 464.

The machine learning model 400 may include additional components such as skip connections, additional neural layers, and other components. In some examples, the various components of the machine learning model 400 may be rearranged where appropriate. The attentive layers may apply attention in accordance with any known techniques, including full/global attention, local attention, efficient attention using clustering, and other techniques. The CNN 416 may be applied in accordance with any known techniques, including the use of several convolutional layers of varying kernel size, and the like.

The output tokenized representation 452 is a sequence of coordinate tokens and operation tokens which may be interpreted to represent the features extracted from the remote imagery 412. The coordinate tokens represent the coordinates of the various geometric entities extracted from the remote imagery 412 (e.g., vertices of building footprint polygon, points along the centerline of a road). The operation tokens represent the types of annotation operations that are used to assemble the vertices together into the resulting geometric entities, including the particular drawing actions that connect the vertices (e.g., straight line segments, curved line segments, two-dimensional primitives, etc.) and the spatial constraints among them (e.g., parallelism).

With a combination of coordinate tokens and operation tokens, the output tokenized representation 452 may accurately encode for detailed design elements and spatial constraints among geometric entities (e.g., the vertices of a building footprint polygon are to be joined by straight lines with certain lines perpendicular and/or parallel to one another, the points along the centerline of a road are to be joined by curved lines, etc.). The use of operation tokens in this manner enables the machine learning model 400 to "draw" or "build" the features extracted from the remote imagery 412 as a more detailed and accurate reflection of the ground truth than by simply outputting a set of vertices.

In the example shown, each output token represents either an annotation operation, or a single dimensional coordinate of a point of a geometric entity (that is, each dimensional coordinate is output one at a time). Thus, the output tokenized representation 452 as shown, in progress, begins with a "start building" token (to indicate that a building footprint is being drawn), followed by a "draw line" token (to indicate the building footprint will begin with the drawing of one or more straight lines), followed by the X-coordinate of the first point of the building footprint, followed by the Y-coordinate of the first point of the building footprint, and so on. The output tokenized representation 452 may proceed in this manner to produce an entire geometric model of the building footprint, shown here as geometric model 472, comprising points A, B, and C (depicted in progress). Although not shown, once the geometric model 472 is completed, the output tokenized representation 452 may output a "close polygon" token that indicates that the preceding vertices are to be grouped together into a closed polygon representing the completed building footprint. The machine learning model 400 may then proceed to output the tokenized representation of the next geometric entity extracted from the remote imagery 412.

It is noteworthy that, since the decoder 450 applies self-attention among the elements of the output tokenized representation 452, the machine learning model 400 may learn to apply different annotation techniques in different annotation scenarios. For example, the machine learning model 400 may be more likely to sample parallel and perpendicular lines following a "start building" token (because buildings are usually drawn with straight lines that are perpendicular and/or parallel to one another). Thus, the machine learning model 400 may learn to opt for different drawing techniques to represent different feature types, which may produce a more detailed and accurate reflection of the ground truth, than if it were limited to modeling the geometry as a set of vertices. For example, the machine learning model 400 learning to sample parallel and perpendicular lines more often when reproducing the geometry of buildings may enable the machine learning model 400 to reconstruct building geometry that is occluded (e.g., by trees or other obstructions) by filling in such occluded areas with parallel and/or perpendicular lines (e.g., an occluded corner of a building).

As mentioned previously, the output tokenized representation 452 may be made interpretable by conventional GIS software, CAD software, and the like, after further processing by an interpretation module, shown here as interpreter 470. The interpreter 470 is configured with a set of rules that provides a complete set of instructions for how to interpret the various coordinate and operation tokens produced by the machine learning model 400. In other words, the interpreter 470 is configured to convert, translate, decode, or otherwise interpret the output tokenized representation 452 as a set of points, lines, and/or polygons (e.g., in some cases a polygonal mesh) representative of the land features extracted from the remote imagery 412, into a format that is suitable for CAD software, GIS, and the like.

The functionality of the machine learning model 400 (and any of its subcomponents), and/or the interpreter 470, may be embodied in programming instructions and executable by one or more processors of one or more computing devices, such as servers in a cloud computing environment, which include memory to store programming instructions that embody the functionality described herein and one or more processors to execute the programming instructions. It is emphasized that the machine learning model 400 (with appropriate modifications if applicable) may be applied to extract vector data representing any sorts of features from any sort of imagery captured by any sort of image capture device.

FIG. 5A depicts an example geometric model 502 derived from vector data generated in accordance with the systems and methods described herein. The geometric model 502 may be understood to represent, for example, a polygon representing an area of land cover or land use (e.g., grassland or building footprint) extracted from remote imagery, and can be understood to be an example of the finished version of the geometric model 472 of FIG. 4.

FIG. 5B, FIG. 5C, and FIG. 5D depict the corresponding graphical representation 504, polygon set representation 506, and tokenized representation 508, respectively. Notably, the tokenized representation 508 comprises a series of coordinate tokens representing vertices of the geometry of the feature, and four operation tokens representing types of annotation operations associated with the series of coordinate tokens. That is, the tokenized representation 508 comprises coordinate tokens $X_0$, $Y_0$, $X_1$, and so on, associated together by the "start building" token, the "draw line" token, the "close polygon" token, and the "end" token.

FIG. 6 is a schematic diagram of an example annotation tool 600 for generating training data for training a machine learning model to extract geometry (and feature types, if applicable) of features depicted in imagery. The annotation tool 600 may be understood to be one example annotation tool to be used by human operators to generate annotation data for the purposes of training a machine learning model, such as the machine learning model used in the vector map generator 122 of FIG. 1. The annotation tool 600 may be referred to as an image annotation interface.

The annotation tool 600 may comprise one or more software modules embodied in non-transitory machine-readable instructions executable by one or more processors of one or more computing devices. The annotation tool 600 shown by way of example here is particularly designed for use through a computing device capable of receiving input from a user through any suitable user input device (e.g., through mouse, keyboard, touchscreen, and the like) and capable of displaying imagery through a display device such as a computer monitor.

In operation, the annotation tool 600 receives source imagery 622 (e.g., remote imagery). The source imagery 622 is expected to depict one or more visual features to be annotated, such as one or more land use or land cover features. The user interface of the annotation tool 600 includes a display window 625 through which the source imagery 622 is displayed to a user, a toolbar 623 with which a user may select various tools for annotating the source imagery 622, and a legend 624 with which a user may select a particular feature type to annotate, as described in greater detail below. These elements are displayed to a user through any suitable display screen.

A user annotates (i.e., "marks-up") the source imagery 622 with the various tools made available through the user interface input components, depicted here as the toolbar 623 and legend 624, which allow the user to draw various land use and land cover features over the source imagery 622. The user may use the legend to select a variety of different feature types to be annotated (e.g., grassland, forest, pavement, building footprint), and the toolbar 623 to annotate these feature types as a variety of different geometric entity types (e.g., points, lines, curves, pre-defined shapes), and to define constraints among existing geometric elements (e.g., define one line as parallel to another).

The annotation tool 600 receives user input 626 (e.g., mouse and keyboard strokes performed at a computer terminal or other computing device). The annotation tool 600 may record such user input 626 as raw data, or as a list of commands to instantiate, define and/or manipulate the various geometric elements and/or constraints that define such features, shown here as annotation data 630. Thus, the annotation data 630 comprises a sequences of annotation operations (i.e., image annotation operations, commands) by which corresponding geometries of visible features are annotated with reference to the source imagery 622. The resulting sequence of annotation operations may be understood as a sequence of commands or instructions that dictate how a geometric model is to be constructed.

In operation, in the present example, a user may annotate the source imagery 622 with various feature types by first selecting a particular feature type from the legend 624, selecting the appropriate annotation tool from the toolbar 623, and proceeding to make the appropriate annotations to the source imagery 622 through the display window 625 (e.g., by tracing out the appropriate features). However, alternative user interface designs that operate differently are contemplated, such as interfaces in which a user first annotates an image with the appropriate geometry and then attributes the annotated geometry with the appropriate feature types. In still other examples, users may select annotation tools that are specific to different feature types, such as line drawing tools that are specifically for annotating building footprints. In any event, a user may annotate the source imagery 622 with geometric representations of the visible features depicted therein, and the annotation tool 600 may store the user input as a sequence of annotation operations in annotation data 630.

In some examples, the annotation data 630 may contain a detailed record of all user input received by the annotation tool 600 (e.g., mouse movements, keyboard strokes, and the like). In other examples, the annotation data 630 may contain only a higher-level record of the key commands issued by the user (e.g., create point, create line, define constraint, and the like). In other examples, the annotation data 630 may contain a cleaned-up/streamlined sequence of operations that filters out redundant commands (e.g., a sequence of commands with edits and erasures like "undo" commands removed).

In some examples, the annotation data 630 may contain other relevant information about the feature being annotated. For example, a feature may be attributed with metadata. In the example where the feature being annotated is a building, the geometric entity representing the building may be attributed with building type (e.g., residential, commercial, etc.) or another relevant attribute.

The resulting annotation data 630 may be contributed to a library of training data that is used to train a machine learning model to extract features from imagery in accordance with the systems and methods as described herein.

It is emphasized that the annotation tool 600 (with appropriate modifications if applicable) may be applied to generate training data for training a machine learning model to extract vector data representing any sorts of features from any sort of imagery captured by any sort of image capture device.

FIG. 7A is a schematic diagram depicting another example annotation tool 700, similar to the annotation tool 600 of FIG. 6, depicting one example land cover feature 702 and one example land use feature 704 annotated over an image 722. As can be seen, the land cover feature 702 is in the shape of an irregular polygon and represents the boundaries of a swamp-like area, and the land use feature 704 is rectangular in shape and represents footprint of a building. Similar to the annotation tool 600 of FIG. 6, the annotation tool 700 of FIG. 7A includes a display window 725 through which the image 722 is displayed to a user, a toolbar 723 with which a user may select various tools for annotating the image 722, and a legend 724 with which a user may select a particular feature type to annotate.

For illustrative purposes, the order of annotation operations in which a user has annotated the image 722 is shown. The user began annotating the land cover feature 702 by selecting the "draw swamp" annotation tool from the legend 724 (action 1) and the "draw line" tool from the toolbar 723 (action 2), then began outlining a polygon representing the swamp using straight lines (actions 3 through 9). The user then proceeded to annotate the land use feature 704 by selecting the "draw building footprint" annotation tool from the legend 724 (action 10) and the "draw line" tool from the toolbar 723 (action 11), then began outlining a polygon representing the building footprint using straight lines (actions 12 through 16).

These annotation operations are stored as the annotation sequence 750 in FIG. 7B. As can be see, the annotation sequence 750 comprises a list of annotation operations performed (e.g., "start swamp", "draw line"), the coordinates of each point that is associated with the annotation operations, and notably, stores this information in the order in which the annotation operations were performed.

The annotation sequence 750 is encoded into a tokenized representation 760 in FIG. 7C. The tokenized representation 760 begins with a "start swamp" token, a "draw line" token, and proceeds with the coordinates of the points that comprise the polygon representing the area of swamp, and so on.

The resulting tokenized representation 760 may be contributed to a library of training data to be used to train a machine learning model, such as the machine learning model used in the vector map generator 122 of FIG. 1, to extract features from imagery. Notably, since the tokenized representation 760 captures not only the geometric information (and feature type information, if applicable) that defines the various geometric entities representing the extracted features, the tokenized representation 760 also captures the particular annotation operations used, and the order in which such annotation operations were performed. Thus, a machine learning model trained on such data may learn to capture the annotation practices exhibited by human users in the generation of training data. A machine learning model trained in such a way will generally learn to annotate images in a manner that is distinct from more naïve, hand-crafted methods.

Figure 8A:
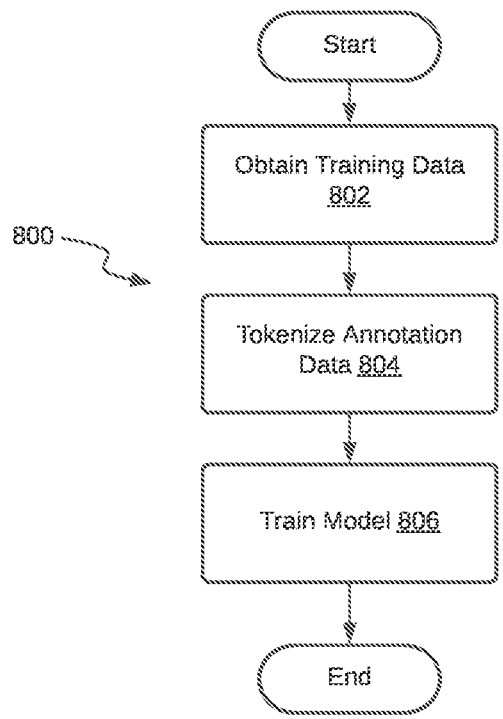
FIG. 8A is a flowchart of an example method for configuring a machine learning model to extract geometry and/or feature types of features depicted in remote imagery.
Figure 8B:
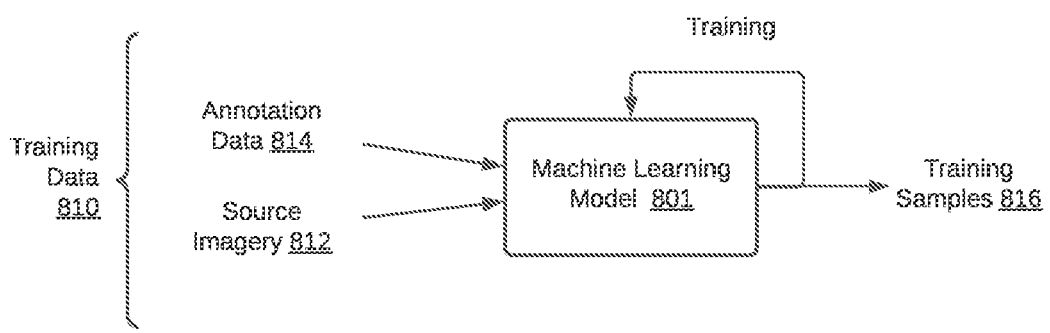
FIG. 8B is a schematic diagram of an example machine learning model to be trained to extract geometry and/or feature types of features depicted in remote imagery.

FIG. 8A is a flowchart of an example method 800 for configuring a machine learning model to extract features depicted in imagery. For reference purposes, the method 800 is also described with reference to FIG. 8B, which depicts a schematic diagram of an example machine learning model. The method 800 can be understood to be one example to configure a machine learning model, such as the machine learning model used in the vector map generator 122 of FIG. 1, to extract land cover and land use features from remote imagery. Similarly, the machine learning model 801 depicted in FIG. 8B can be understood to be similar to the machine learning model used in the vector map generator 122 of FIG. 1, during training.

At operation 802, training data 810 is obtained. Training data 810 includes source imagery 812 (training imagery) and annotation data 814. For example, the source imagery 812 may include a set of remote imagery that depicts land use and/or land cover features. The annotation data 814 may include a list of annotation operations by which one or more users have annotated the source imagery 812 with feature information. For example, the annotation data 814 may be similar to the annotation sequence 750 of FIG. 7B, that list the various annotation operations carried out by users annotating remote imagery with land use and land cover features. The annotation data 814 is matched to the source imagery 812 (i.e., each annotation sequence is matched to the corresponding image that the annotation sequence was generated from).

At operation 804, the annotation data 814 is tokenized for training purposes. For example, the annotation data 814 may be tokenized into a form similar to the tokenized representation 760 of FIG. 7C. That is, the annotation data 814 may be converted into a tokenized representation that describes the sequences of annotation operations performed to mark-up the source imagery 812. Such a tokenized representation will contain coordinate tokens and operation tokens that can be interpreted as a set of instructions for how geometric models representative of the features extracted from the source imagery 812 are to be constructed.

At operation 806, the machine learning model 801 is trained on the training data 810. Any appropriate machine learning training methods may be used, such as stochastic gradient descent. The machine learning model 801 is trained to minimize a cost function that computes the error between the geometric elements in training samples 816 as compared to a training set. The cost function may further compute the error between the appropriate operation tokens. As described above with reference to FIG. 7C, the training samples (tokenized representations) capture the particular annotation operations performed in the annotation data 814 and the order in which such annotation operations are performed. Since the machine learning model 801 is to be trained to treat the sequence of annotation operations as ordered sequences in which order is important, the machine learning model 801 should be trained to minimize a cost function that defines error as being between the $n^{th}$ token a training sample as compared to the $n^{th}$ token in a reference set.

Since the training data used to train the machine learning model 801 comprises labelled data, the machine learning model 801 is trained with supervised learning. However, it is contemplated that in other examples, the machine learning model 801 may be trained in a semi-supervised manner.

The method 800 and/or any of its steps may be embodied in non-transitory machine-readable programming instructions and executable by one or more processors of one or more computing devices, such as servers in a cloud computing environment, which include memory to store programming instructions that embody the functionality described herein and one or more processors to execute the programming instructions. It is emphasized that the method 800 (with appropriate modifications if applicable) may be applied to train a machine learning model extract vector data representing any sorts of features from any sort of imagery captured by any sort of image capture device.

Figure 9:
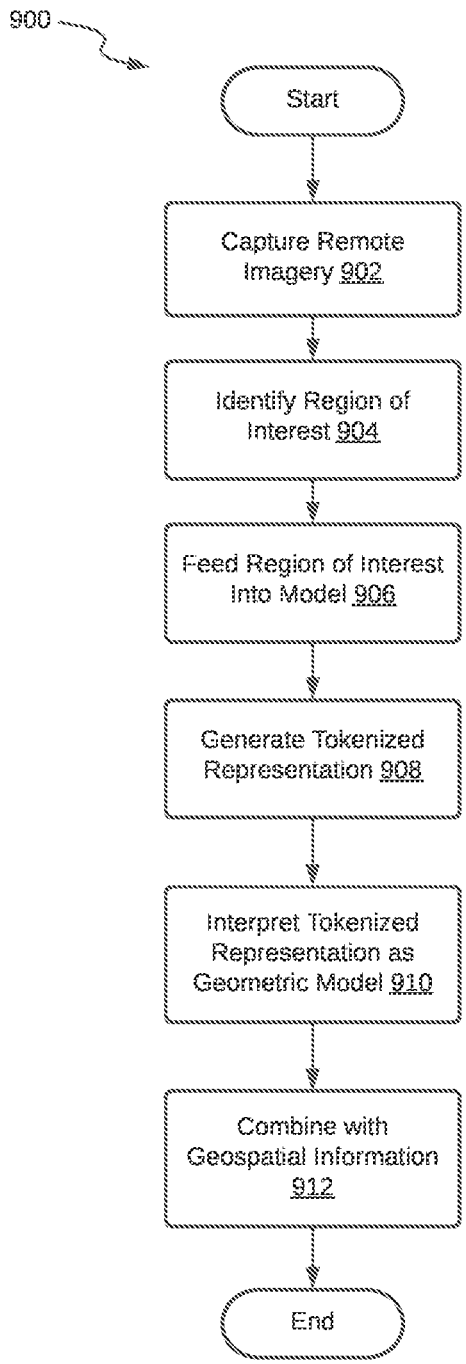
FIG. 9 is a flowchart of an example method for generating a vector map representing a feature extracted from remote imagery, shown in greater detail.

FIG. 9 is a flowchart of an example method 900 for generating a vector map representing a feature extracted from remote imagery. The method 900 can be understood to be another example of the method 200 of FIG. 2, shown in greater detail.

At operation 902, remote imagery that depicts one or more visible land features is captured. As in the method 200 of FIG. 2, remote imagery may be captured by a satellite, aircraft, or other suitable image capture device, depicting a visible land feature such as a land use or land cover feature.

At operation 904, a region of interest in the captured imagery is identified. In some cases, the size of the imagery directly provided by the image capture device being used may be too large to directly process in its entirety. In such cases, it may be advantageous to divide the larger source image into smaller images that may be more easily processed. There are several techniques available for dividing up a larger source image for such a purpose. For example, various image segmentation and/or image parsing techniques may be used to partition the large source image into smaller images, and any of these smaller images may be taken to be a region of interest. In another example, an object detector may be applied over the larger source image, and when the object detector identifies an object of interest, the object detector may crop out the object and its surrounding area to be used as the region of interest.

At operation 906, the region of interest identified in operation 904 is fed into a machine learning model that is configured to extract vector data from the region of interest. Such a machine learning model may be similar to the machine learning model used in the vector map generator 122 of FIG. 1.

At operation 908, the machine learning model referenced in operation 906 generates a tokenized representation of one or more visible features extracted from the region of interest. This operation may be similar to operation 204 of FIG. 2.

At operation 910, the tokenized representation is interpreted as a geometric model. That is, an interpreter similar to the interpreter 470 of FIG. 4 interprets the tokenized representation, which contains coordinate tokens and operation tokens, as a geometric model that is suitable for conventional GIS or CAD software and the like. This operation may be similar to operation 206 of FIG. 2.

At operation 912, the geometric model is combined with geospatial information, enabling the geometric model to be accurately plotted on a map.

The method 900 and/or any of its steps may be embodied in non-transitory machine-readable programming instructions and executable by one or more processors of one or more computing devices, such as servers in a cloud computing environment, which include memory to store programming instructions that embody the functionality described herein and one or more processors to execute the programming instructions.

Figure 10A:
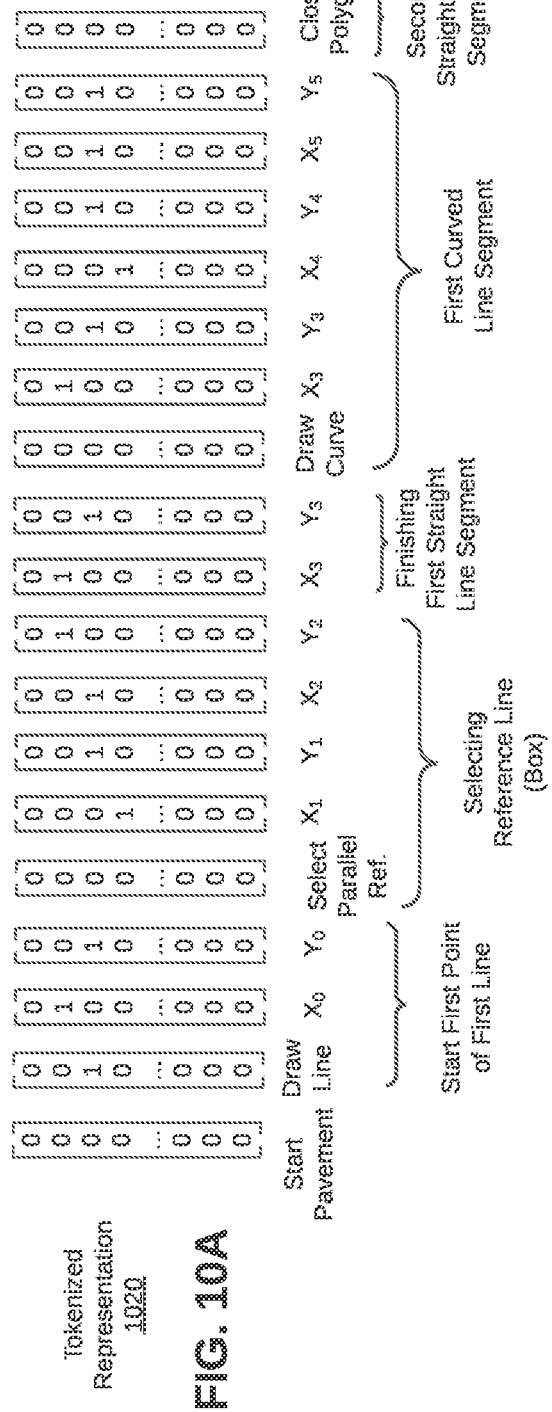
FIG. 10A depicts an example tokenized representation of a sequence of annotation operations.
Figure 10B:
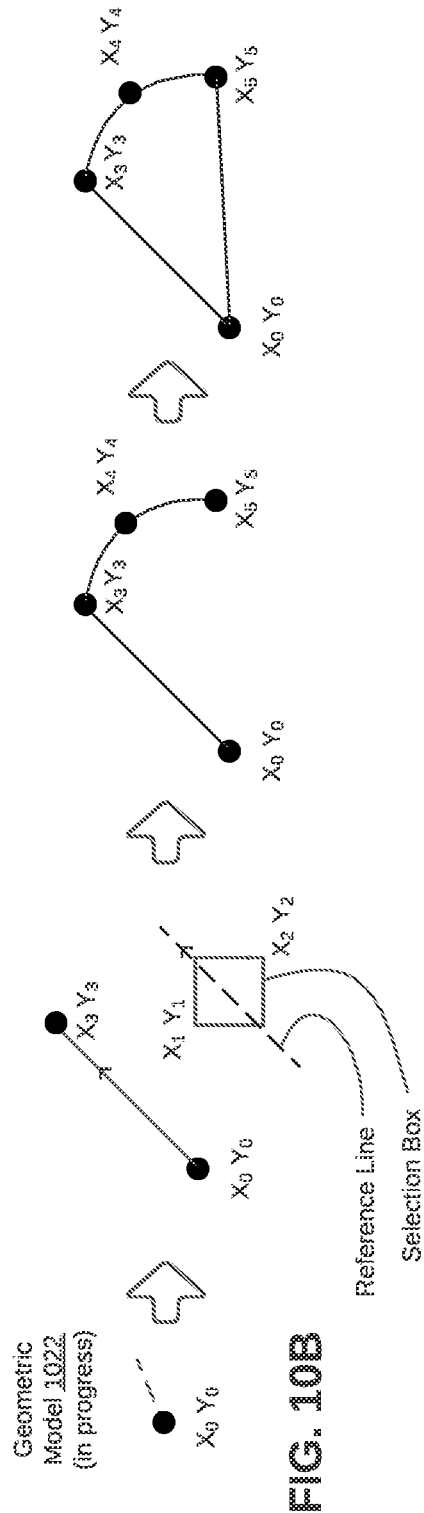
FIG. 10B depicts the generation of the corresponding geometric model.

FIG. 10A depicts an example tokenized representation 1020 representing a sequence of annotation operations that may be produced in accordance with the systems and methods described herein. FIG. 10B depicts the generation of the corresponding geometric model 1022.

The tokenized representation 1020 and corresponding geometric model 1022 represent a wedge-shaped polygon with one line defined as parallel to a pre-existing line that is present elsewhere in the vector data. In particular, the line segment $X_0, Y_0 \rightarrow X_3, Y_3$ is defined as being parallel to an existing reference line by a selection operation performed by a user in training data. In the present example, the particular selection operation used is a selection box defined around the existing reference line. Such a selection operation may be replicated by a machine learning model trained on annotation data as described herein. The use of a selection box is one example of a way in which a selection operation can be made by selecting an existing geometric element directly in the existing vector space as the vector data is being generated (i.e., a spatial selection operation). Other example selection operations are contemplated, such as the use of a selection line (drawing a selection line through a target reference object), a selection point (selecting a point directly on a target reference object), or a multiple-select operation (e.g., selecting points on multiple target reference objects, e.g., while holding down a particular input key such as the "shift" key).

Proceeding through the tokenized representation 1020, it can be seen that the tokenized representation 1020 begins with a "start pavement" token and a "draw line" token followed by two coordinate tokens to instantiate a line segment representing an area of pavement beginning at a first point $(X_0, Y_0)$. The tokenized representation 1020 continues with a "select parallel reference" token, followed by a means for selecting a target reference geometry (in this case a selection box from $X_1, Y_1$ to $X_2, Y_2$ selects a reference line). The tokenized representation 1020 continues with a series of tokens that finishes the first straight line segment (in this case a coordinate token $X_3, Y_3$—but in other examples a single X or Y coordinate or a magnitude of the line segment may be used).

One way the preceding series of annotation operations may have been carried out in training data is as follows: a user begins drawing a line by creating the first point $(X_0, Y_0)$, and while the annotation tool is expecting input for a second point, the user indicates that the line being drawn is to be made parallel to the existing reference line (e.g., by right clicking or otherwise indicating the reference line with the selection box), thereby narrowing the options for where the second point may land, and then proceeds to finish the first line segment by plotting the second point under that restriction (point $X_3, Y_3$). It is emphasized that such selection operations may be captured in training data in several different ways (as described above) and expressed by a machine learning model in operation tokens in several different ways.

The tokenized representation 1020 then proceeds with the drawing of a curved line segment, from $X_3, Y_3$ through $X_4, Y_4$ to $X_5, Y_5$, and finishes with a "close polygon" token that can be interpreted as closing the polygon by drawing a second straight line segment from the last point in the sequence to the first point in the sequence.

The tokenized representation 1020 provides an example output of a machine learning model trained to produce an output that not only represents an advanced geometric modelling procedure with several different types of drawing tokens (e.g., lines and curves), but which also is capable of encoding for selection operations. That is, a machine learning model may be trained to make annotation operations that refer to one or more previously defined geometric elements (e.g., to define a constraint), directly within its deep learning architecture, by generating selection tokens directly within the output tokenized representation. Thus, a sequence of annotation operations may include a selection operation with which a constraint on one geometric entity may be defined with respect to another geometric entity.

Figure 11:
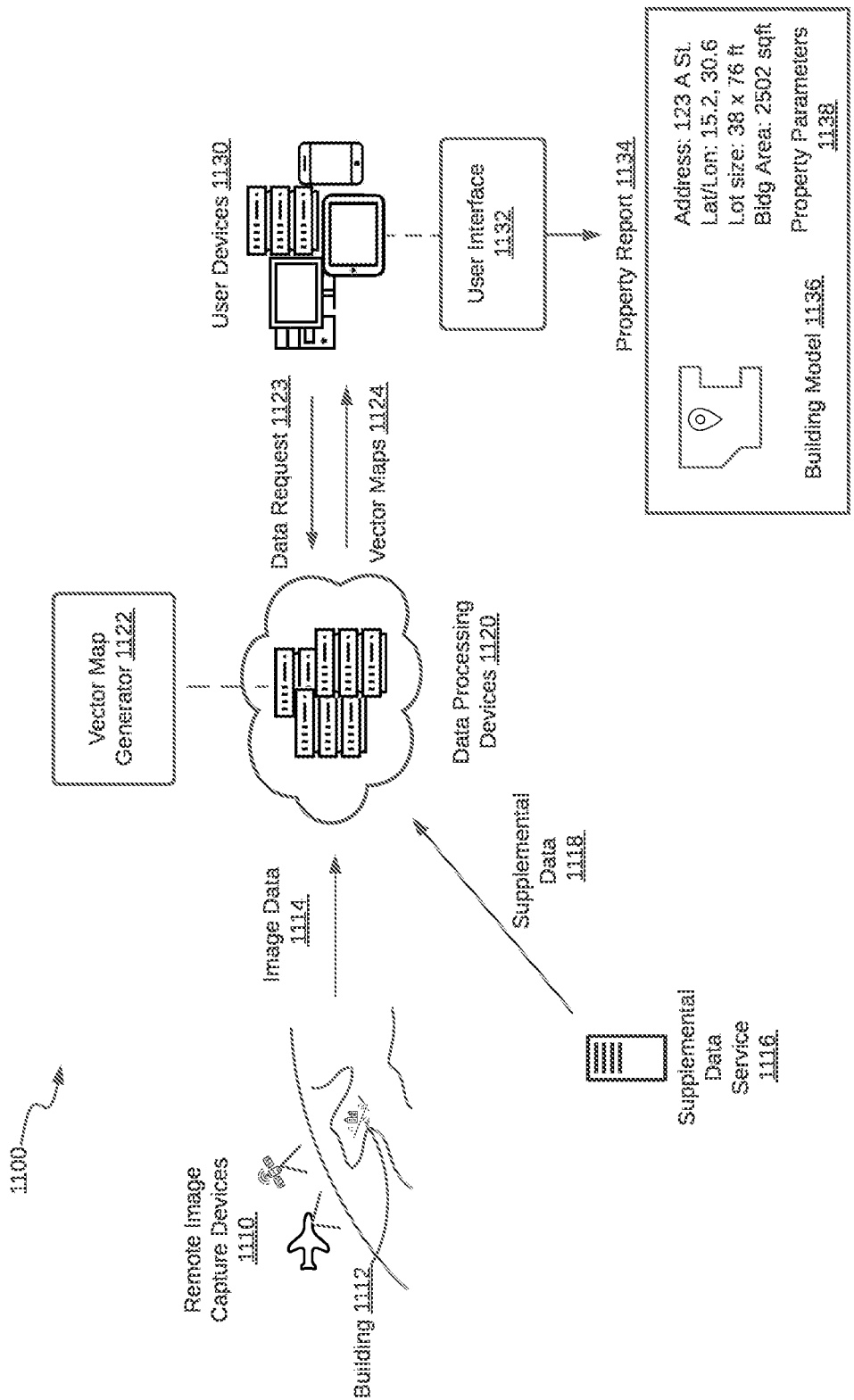
FIG. 11 is a schematic diagram of an example system for generating and transmitting building data.

FIG. 11 is a schematic diagram of an example system 1100 for generating and transmitting building data. The system 1100 can be understood to be one example application of the system 100 of FIG. 1, where the vector data can be used to derive building data pertaining to a particular building of interest.

As in FIG. 1, the system 1100 of FIG. 11 includes one or more remote image capture devices 1110 to capture image data 1114 over an area of the world depicting one or more visible land features. In the present example, one of the features includes a building 1112 that will be the subject of a request for information as described in greater detail below.

As in FIG. 1, the system 1100 of FIG. 11 further includes one or more data processing devices 1120 to extract vector data from the image data 1114 and the build vector maps 1124 as described herein. In the present example, the vector maps 1124 include geospatial information pertaining to the building 1112, which may include a building footprint or another geometric representation of the building 1112. The data processing devices 1120 store, host, access, run, or execute a vector map generator 1122 to extract vector data from the image data 1114 and produce the vector maps 1124, including, for example, the geospatial information pertaining to the building 1112.

As in FIG. 1, the vector maps 1124 of FIG. 12 may be transmitted to one or more user devices 1130, which may be used to store, view, manipulate, and/or otherwise use such vector maps 1124, for example through a user interface 1132. However, in the present example, it is typically expected that vector maps 1124 are transmitted to user devices 1130 in response to requests for data. For example, in general, a user device 1130 (i.e., a requestor) may transmit a data request 1123 to a data processing device 1120, containing a request for information about the building 1112. One or more data processing devices 1120 may have derived, at least in part from a vector map 1124, building data corresponding to the building 1112. In response to the request, a data processing device 1120 may transmit the building data to a user device 1130.

The aforementioned process may be applicable to use cases in which the data processing devices 1120 store building data pertaining to a plurality of buildings for which certain data may be requested. For example, the data processing devices 1120 may offer an Application Programming Interface (API) service through which a user device 1130 may query the data processing devices 1120 with an address pertaining to a particular building 1112 (the request), and the data processing devices 1120 may respond with vector data representing a building footprint of the building 1112, and other associated information.

In such a use case, the data processing devices 1120 may access one or more supplemental data services 1116 for supplemental data 1118 to assist in processing such requests. A supplemental data service 1116 may include one or more computing devices, such as servers in a cloud computing environment, which include one or more communication interfaces for communicating with the data processing devices 1120. One such example supplemental data service 1116 may include a geocoding service that provides building address data associated with geospatial information (e.g., latitude and longitude coordinates) that the data processing devices 1120 may match to addresses contained in information requests, thereby allowing the data processing devices 1120 to pinpoint the appropriate location and building footprint in pre-generated vector data corresponding to the address contained in a request for information from a user device 1130. Another example supplemental data service 1116 may include a legal land parcel data provider that provides parcel data associated with various addresses (e.g., coordinates indicating parcel boundaries), which may be bundled together with the building footprint and other information in response to a request.

Extending the present example further, the data processing devices 1120 may respond to a request for information pertaining to a particular building 1112 with property data associated with the building 1112. Such property data may be bundled together with vector data generated by the data processing devices 1120 into a property report 1134. Such a property report 1134 may include a building model 1136 (e.g., building footprint) representative of the building 1112, and associated property parameters 1138, such as an address associated with the building 1112, geospatial coordinates indicating a centroid or other central position within the building model 1136, a square footage of the building 1112 (derived from the building model 1136), parcel dimensions (obtained from a supplemental data service 1116), among other data types. In some examples, the building model 1136 may be attributed with dimensions, including wall lengths, square footage, and the like.

In some examples, one or more data processing devices 1120 may enhance property data obtained from a supplemental data service 1116 with reference to building data derived from vector data generated by the data processing devices 1120. For example, geospatial coordinates pertaining to a particular address may be corrected to correspond to a centroid or other central position within a building footprint of a building 1112, thereby improving the accuracy of the geocoded location of the building 1112. Such data enhancement may be particularly advantageous in cases where supplemental data services provide inaccurate geocoded locations for buildings (e.g., derived from parcel boundaries which may not accurately reflect the true location of a building).

Although the present use case describes the provision of building data on-demand in response to information requests, in some cases, such data may be provided to user devices 1130 in bulk for ease of access.

The use case described herein may be particularly useful in the insurance industry for providing building information to assist insurers with insurance underwriting and claims assessment, in the construction industry for estimating labor and material costs associated with projects, and in other applications.

Thus, the systems and methods described herein may be applied to automatically generate vector data representing any sorts of features from any sort of imagery captured by any sort of image capture device, and may be particularly useful to extract vector data from remote imagery depicting land features such as building footprints, roads, grass, bodies of water, and the like, where producing vector data at scale is particularly challenging. Machine learning models may be trained to generate such vector data by training on annotation data, thereby learning to annotate imagery in a manner that emulates how a human would annotate such imagery using a variety of drawing elements and defining various spatial constraints directly within deep learning architecture. The machine learning models applied may include autoregressive generative models that apply aspects of attention for their capability to capture long dependency relationships present in such annotation data. Applications of such systems and methods include city and environmental planning, the generation of digital twins for cities, the generation of ground-truth vector data for augmented reality and virtual reality purposes, insurance claims assessments and underwriting, among other applications.

It should be recognized that features and aspects of the various examples provided above can be combined into further examples that also fall within the scope of the present disclosure. The scope of the claims should not be limited by the above examples but should be given the broadest interpretation consistent with the description as a whole.

The invention claimed is:

1. A method for generating a vector map of a geometric model that represents a landcover or land use feature depicted in remote imagery, wherein the method comprises:
   obtaining remote imagery that depicts the landcover or land use feature;
   encoding the remote imagery into a feature map;
   decoding a sequence of tokens that represents the geometric model, autoregressively, token-by-token, wherein decoding each token comprises:
   applying cross-attention across the feature map;
   applying self-attention across any previously decoded tokens in the sequence of tokens; and
   generating the token based on at least the cross-attention and the self-attention; and
   interpreting the sequence of tokens as the vector map of the geometric model that represents the landcover or land use feature;
   wherein the sequence of tokens comprises a combination of coordinate tokens and operation tokens, wherein each coordinate token represents one or more coordinates of a vertex of the geometric model, and wherein at least one operation token represents a drawing action to be performed to connect at least two vertices of the geometric model.

2. The method of claim 1, wherein interpreting the sequence of tokens as the vector map involves connecting each vertex of the geometric model following the sequence in which the coordinate tokens were decoded.

3. The method of claim 1, wherein at least one operation token represents a landcover or land use type of the feature, wherein the type is selected from a group of features comprising pervious surfaces or impervious surfaces.

4. The method of claim 3, wherein the feature comprises a building.

5. The method of claim 3, wherein the feature comprises a road centerline.

6. The method of claim 1, wherein at least one operation token represents a selection operation by which a constraint on the coordinates of particular vertex of the geometric model is defined with reference to a previously generated group of vertices of the geometric model.

7. The method of claim 1, further comprising:
attributing the vector map with scale information extracted from metadata associated with the remote imagery.

8. A system for generating a vector map of a geometric model that represents a landcover or land use feature depicted in remote imagery, the system comprising one or more computing devices configured to:
obtain remote imagery that depicts the landcover or land use feature;
encode the remote imagery into a feature map;
decode a sequence of tokens that represents the geometric model, autoregressively, token-by-token, wherein decoding each token comprises:
applying cross-attention across the feature map;
applying self-attention across any previously decoded tokens in the sequence of tokens; and
generating the token based on at least the cross-attention and the self-attention; and
interpret the sequence of tokens as the vector map of the geometric model that represents the landcover or land use feature;
wherein the sequence of tokens comprises a combination of coordinate tokens and operation tokens, wherein each coordinate token represents one or more coordinates of a vertex of the geometric model, and wherein at least one operation token represents a drawing action to be performed to connect at least two vertices of the geometric model.

9. The system of claim 8, wherein interpreting the sequence of tokens as the vector map involves connecting each vertex of the geometric model following the sequence in which the coordinate tokens were decoded.

10. The system of claim 8, wherein at least one operation token represents a landcover or land use type of the feature, wherein the type is selected from a group of features comprising pervious surfaces or impervious surfaces.

11. The system of claim 10, wherein the feature comprises a building.

12. The system of claim 10, wherein the feature comprises a road centerline.

13. The system of claim 8, wherein at least one operation token represents a selection operation by which a constraint on the coordinates of particular vertex of the geometric model is defined with reference to a previously generated group of vertices of the geometric model.

14. The system of claim 8, wherein the one or more computing devices are configured to:
attribute the vector map with scale information extracted from metadata associated with the remote imagery.

15. At least one non-transitory machine-readable storage medium comprising instructions that when executed cause one or more processors to:
obtain remote imagery that depicts a landcover or land use feature;
encode the remote imagery into a feature map;
decode a sequence of tokens that represents a geometric model of the landcover or land use feature, autoregressively, token-by-token, wherein decoding each token comprises:
applying cross-attention across the feature map;
applying self-attention across any previously decoded tokens in the sequence of tokens; and
generating the token based on at least the cross-attention and the self-attention; and
interpret the sequence of tokens as a vector map of the geometric model that represents the landcover or land use feature;
wherein the sequence of tokens comprises a combination of coordinate tokens and operation tokens, wherein each coordinate token represents one or more coordinates of a vertex of the geometric model, and wherein at least one operation token represents a drawing action to be performed to connect at least two vertices of the geometric model.

16. The at least one non-transitory machine-readable storage medium of claim 15, wherein:
interpreting the sequence of tokens as the vector map involves connecting each vertex of the geometric model following the sequence in which the coordinate tokens were decoded.

17. The at least one non-transitory machine-readable storage medium of claim 15, wherein at least one operation token represents a landcover or land use type of the feature, wherein the type is selected from a group of features comprising pervious surfaces or impervious surfaces.

18. The at least one non-transitory machine-readable storage medium of claim 17, wherein the feature comprises a building or road centerline.

19. The at least one non-transitory machine-readable storage medium of claim 15, wherein at least one operation token represents a selection operation by which a constraint on the coordinates of particular vertex of the geometric model is defined with reference to a previously generated group of vertices of the geometric model.

20. The at least one non-transitory machine-readable storage medium of claim 15, wherein the instructions when executed cause the one or more processors to:
attribute the vector map with scale information extracted from metadata associated with the remote imagery.

* * * * *